Nov. 7, 1967 M. L. MIDGLEY 3,351,875
RING COUPLED MECHANICAL FILTER
Filed Dec. 20, 1962 3 Sheets-Sheet 1

INVENTOR.
MELVIN L. MIDGLEY
BY *Moody and Phillior*
ATTORNEYS

Nov. 7, 1967  M. L. MIDGLEY  3,351,875
RING COUPLED MECHANICAL FILTER
Filed Dec. 20, 1962  3 Sheets-Sheet 3

INVENTOR.
MELVIN L. MIDGLEY
BY *Moody and Phillion*
ATTORNEYS

United States Patent Office 3,351,875
Patented Nov. 7, 1967

3,351,875
RING COUPLED MECHANICAL FILTER
Melvin L. Midgley, Santa Ana, Calif., assignor to Collins Radio Company, Cedar Rapids, Iowa, a corporation of Iowa
Filed Dec. 20, 1962, Ser. No. 246,051
3 Claims. (Cl. 333—71)

This invention relates, generally, to center coupled mechanical filters and, more specifically, to center coupled mechanical filters in which the center coupling comprises a short, tubular or ring-like section which joins together the adjacent disks at or near one of the nodular rings of the disks.

Mechanical filters are well known in the art. One form of mechanical filter employs a variety of disks, stacked together a distance apart and having their axes fall along a common center line. The disks are positioned and supported structurally in their respective positions by coupling wires which are secured to the perimeters of the disks. Such coupling wires also function to transmit energy along the column of disks. In some forms of mechanical filters there is employed another coupling means known as a center coupling means which couples together the centers of the disks. Such center coupling means in prior art devices have been in the form of a solid rod. It is to be noted that in all mechanical filters employing two or more disks the center coupling rod is employed with perimeter coupling rods.

While perimeter coupled mechanical filters have been quite successful commercially, there are areas in which improvement appears possible. For example, the dimensions of prior mechanical filters are critical, as is the welding of the coupling rods to the individual disks. It has been found that, unless such welding is done within rather strict tolerances, the operation of the mechanical filter is affected adversely. If the requirements for the present exacting manufacturing specifications can be relieved somewhat, the cost of mechanical filters can be reduced. Another area in which improvement in existing mechanical filters can be made is in the size. Present filters require a ratio of thickness-to-disk diameter of be one to five. If such ratio can be decreased, the size (length) of the mechanical filter can be reduced substantially.

While the performance of present filters has been satisfactory, there exists a certain amount of spurious response which, if reduced, would increase the efficiency of mechanical filters.

One of the primary difficulties presented heretofore by mechanical filters employing only center coupling was the matter of structural strength. More specifically, it has been found that up to the present time mechanical filters employing only a center coupling rod have been quite weak and will not withstand the shock and vibration tests necessary to qualify for most governmental and many commercial applications. Another difficulty of such filters is in the manufacturing thereof. Due to the fact that the mass of the rod connecting together two disks is small compared to the mass of either of the two disks, it is difficult to heat the junction between the rod and the disk properly to perform an effective weld joint. More specifically, it has been found that holes frequently are burned in the disk around the junction of the rod and the disk due to the uneven distribution of heat.

Two other problems presented by center coupled, narrow bandwidth filters are: (1) the excessive deflection of the filter structure and (2) the large stresses applied to the small diameter wire. The large static deflections due to the small diameter o the wire (or a low Young's Modulus) result in undesirable low frequency modes of vibration which, in turn, lead to increased microphonic responses. Excessive stresses (due to shock or vibration) applied to the coupling wire cause destruction of the filter structure. In general, there are two approaches to the solution of the foregoing problems. One approach is to find a center coupling wire material that resists bending and at the same time has considerable strength. The second is to support the structure in a manner that will decrease both the bending and the applied stresses.

An object of the present invention is to provide a coupling means in a mechanical filter which avoids many of the limitations of perimeter or edge-coupled mechanical filters while at the same time preserving the structural strength and good operating characteristics thereof.

A further purpose of the invention is to provide a ring-coupled mechanical filter which eliminates the need for edge-coupling means.

A third object of the invention is a ring-coupled filter which is easy to manufacture at a relatively low cost, compared to prior art mechanical filters.

A further object of the invention is a low-cost, easily-manufactured, reliable mechanical filter having selective passband frequencies of the order of two to four kilocycles.

A fifth aim of the invention is the improvement of mechanical filters, generally.

In accordance with the invention, there is provided a plurality of disks spaced apart by ring coupling means and having their axes lie along a common center line. The ring coupling means consists of a relatively thin-walled section of tubing, whose mean diameter is substantially equal to the diameter of one of the circular flexural modes of the disks to which it is coupled. The length of the coupling ring is slightly less than $\lambda/8$ where $\lambda$ is the wavelength of the middle frequency of the frequency passband. Since the coupling ring is placed further from the center of the disk than rods similarly employed in prior art structures, there results a filter of greater strength. Secondly, since the coupling ring is placed near or at a velocity nodal circle or ring on the disk, there is less coupling of energy from one disk to another, thus enabling the use of a ring of larger cross-sectional area for a given bandwidth.

In accordance with a feature of the invention, the coupling rings can be a unit separate from the disks, and can be secured at its two ends to the two adjacent disks by suitable means such as welding.

In accordance with an alternative form of the invention, each disk can be made with a half section of a ring coupling means formed integrally on each face thereof so that only one weld joint is required between any two adjacent disks.

In accordance with another feature of the invention, the ring coupling means may be bonded to the disks, or to each other if a half section of coupling means is formed on each disk, by means of an epoxy type bonding compound.

The above-mentioned and other objects and features of the invention will be more clearly understood from the following detailed description thereof, when read in conjunction with the drawings, in which.

Figure 1:
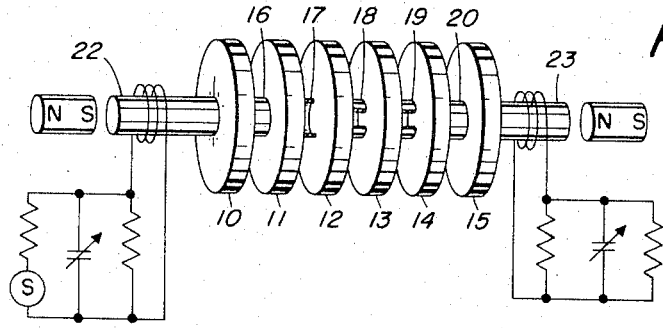
FIG. 1 is a combination schematic diagram and perspective view of a ring-coupled mechanical filter.

Referring now to FIG. 1, the six disks of the mechanical filter shown therein are identified by reference characters 10 through 15, inclusively. The two end disks 10 and 15 are tuned to the same frequency as the ferrite cores 22 and 23, and exhibit low mechanical impedances at the points of connection to the coupling rings 16 and 20, respectively. Consequently, such connections have little effect on the modes of vibration of the disks 11, 12, 13, and 14. The length of coupling rings 16, 17, 18, 19, and 20 between the disks is slightly less than 1/8 of a wave length, allowing them to be considered as lumped elements, i.e., springs or compliances, in the structure of FIG. 1. The spacing between the first two disks 10 and 11 and the last two disks 14 and 15, can be reduced in order to increase the coupling between these disks. Such increase in coupling is desirable since the combination of an end disk 10 and the ferrite core 22 provides a greater than half-section termination, which constitutes the best termination for the filter.

Figures 2, 2A:
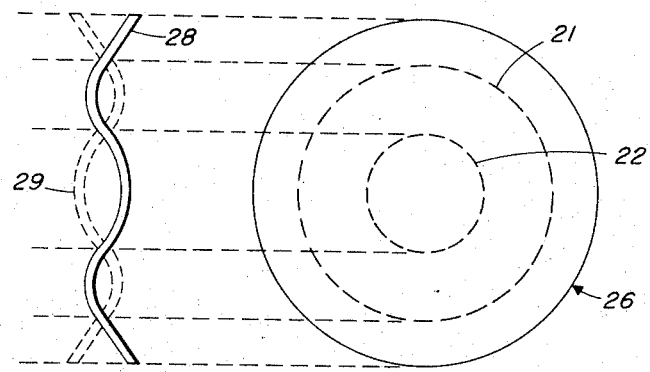
FIGS. 2 and 2a illustrate the characteristics of a disk in a two-nodal circular flexural mode.

Referring to FIG. 2, there is shown a plan view of a disk 26 having a two-nodal circular flexural mode of vibration. Such mode of vibration is illustrated in FIG. 2a, wherein a side view of the disk 26 in its two extreme positions of oscillation is shown. More specifically, the solid line configuration 28 represents the disk at one peak of its oscillatory motion and the dotted line configuration 29 represents the disk 26 at the opposite extreme excursion of its oscillation, 180° removed from configuration 28. It will be observed that the disk 26 has two circular nodes represented by the dotted lines 21 and 72, at which nodes the amplitude of oscillation remains zero.

The coupling rings are welded, or otherwise secured as by an epoxy bonding agent, at or near one of the circular nodes 21 or 72. The particular node employed is related to the range of frequency operation of the filter. As a general rule, it might be said that under 200 kilocycles the inner nodal ring 22 is best employed; that is, the coupling rings are welded at or near the inner nodal ring 22. Above 200 kilocycles the coupling rings are increased in size and are welded to the outer nodal ring 21 to obtain the best operating characteristics.

The advantage of securing the coupling rings to one of the nodal rings 21 or 22 can be seen from the following expression:

$$BW = \frac{EA}{2\pi^2 f_o \text{ Meq } L} \quad (1)$$

where BW is bandwidth, E is Young's Modulus, A is the cross-sectional area of the tubing, L is the length of the coupling ring, $f_o$ is the cut-off frequency, and Meq is the equivalent mass of the disk. It is a known fact that as the coupling ring is moved towards a nodal ring, the equivalent mass Meq is increased, thus resulting in a decreased bandwidth. Thus, from an examination of Expression 1 it will be seen that a fairly thick-walled coupling ring placed over a nodal circle will result in a relatively narrow bandwidth of operation.

The exact location of the nodal ring, such as rings 21 and 22 of FIG. 2 must, of course, be known before construction of a filter can be made. It has been found that the displacement $\eta$ of a nodal ring along a radius of a disk, such as disk 20 of FIG. 2, may be expressed by the following expression:

$$\eta = A_1 J_o(\delta_1 r) + A_2 I_o(\delta_2 r) \quad (2)$$

Where $A$ and $A_2$ are amplitude constants, $\delta_1$ and $\delta_2$ are parameters which define the equations of motion in infinite isotropic circular disks, when rotary inertia and shear deformation are taken into consideration, $J_o$ is a Bessel function of the first kind, $I_o$ is a modified Bessel function of the first kind, and $r$ is the radius of the disk.

For a full derivation of Expression 2 reference is made to page 1153 of volume 28, No. 6, of The Journal of the Acoustical Society of America, November 1956, wherein there appears an article entitled "Equivalent Circuit of a Resonant, Finite, Isotropic Elastic Circular Disk" by Roshan Lal Sharma.

Expression 1 above can be derived from Expression 14 of the aforementioned article in the following manner:

From 14

$$\text{Meq} = \frac{1}{\pi^2 C_2(f_B{}^2 - f_A{}^2)} = \frac{1}{\pi^2 C_2(f_B - f_A)(f_B + f_A)}$$
$$= \frac{1}{\pi^2 C_2 \cdot 2 f_o (f_B - f_a)} \frac{1}{\pi^2 C_2 \cdot 2 f_o BW}$$

When $$C_2 = \frac{l}{\mu S}$$

$$f_o = \frac{f_A + f_B}{2}$$

and $l$ = length
$\mu$ = Young's modulus = $E$
$S$ = Cross sectional area = $A$

Thus $$BW = \frac{1}{2\pi^2 (C_2) f_o \text{ Meq}} \frac{1}{2\pi^2 \left(\frac{l}{EA}\right) f_o \text{ Meq}}$$

$$BW = \frac{EA}{2\pi^2 f_o \text{ Meq } l}$$

Figure 5:
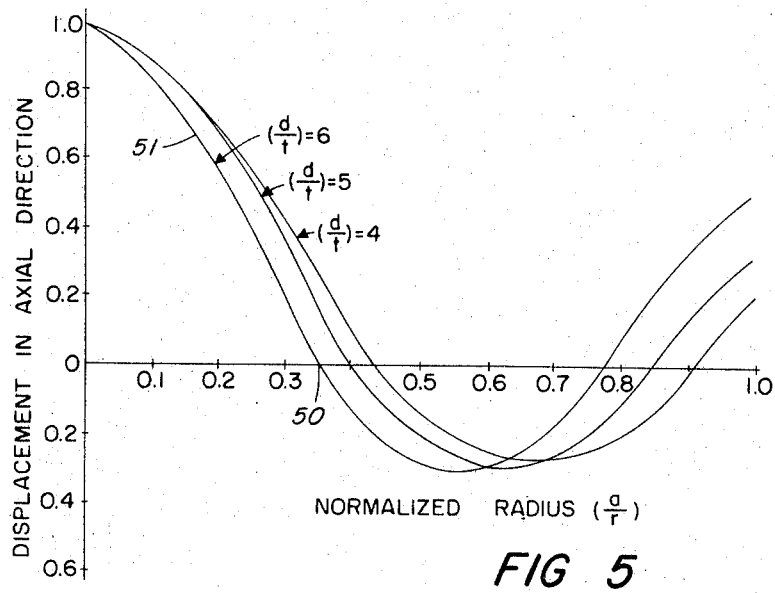
FIG. 5 is a frequency-versus-attenuation characteristic of a ring-coupled mechanical filter employing four disks.

In FIG. 5 there is shown a plot of the function of Expression 2. The three cases illustrated in FIG. 5 represent disks having diameter-to-thickness ratios ($D/T$) of 4, 5, and 6. It can be seen that the positions of the first nodal rings (which occur at $o$ displacement) are affected somewhat less than that of the second nodal rings for differences in the diameter-to-thickness ratio.

The curves of FIG. 5 provide two useful functions. One of these functions is that the effect on coupling owing to variations in disk dimensions may be anticipated to some degree. Secondly, the actual coupling due to differences in basic design may be estimated. More specifically, it is known that two principal factors control the bandwidth in the type filter construction being described herein. One of these principal factors has been mentioned hereinbefore and relates directly to the degree of coincidence between the diameter of the coupling ring and the diameter of the circular node of the disk to which it is being secured. The other factor is the thickness of the ring wall. It has been found that the thicker the ring wall, the wider the passband.

As a specific example, in the case where a one-eighth inch diameter coupling ring with a .006 inch wall is employed, a passband of three kilocycles results. However, when the wall thickness is increased to 0.10 inch, a passband of approximately six kilocycles results. It should be noted in the drawing of FIG. 5 that the abscissa of the curve has a scale of $a/r$ wherein the radius of the disk is normalized to unity. More specifically, $a$ is the radius of the coupling ring and $r$ is the radius of the disk, with $r$ being normalized to a value of 1.

From the foregoing discussion it can be concluded that the narrowest bandwidth is obtained by making the walls of the ring as thin as possible and also making the diameter of the ring coincide with the diameter of the nodal ring of the disk. Thus, in the case where coupling rings having a diameter of one-eighth inch are employed and where it is desired to have the coupling ring coincide with the first nodal ring of a disk having a $D/T$ of six, the diameter of the disk will be .347 inch. From curve 51 of FIG. 5 it can be seen that the ratio of the diameter 2a of the coupling ring to the diameter 2r of the disk is .36, which is defined by crossover point 50 of the curve of 51 of FIG. 5. Thus, the diameter of the disk will be .125÷.36=.347 inch.

After the various dimensions of the coupling ring and the disk have been determined, it is still necessary to secure the coupling rings to the disks to form the filter. The discussion will now be directed toward such fabrication.

Figure 3:
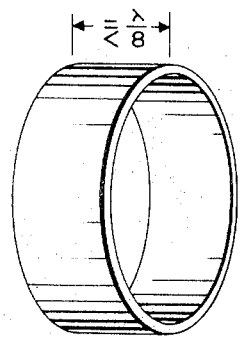
FIG. 3 is a perspective view of a ring coupling means.

In welding the coupling rings of the type shown in FIGS. 1 and 3 to the disks, certain difficulties arise with conventional welding means. More specifically, it is difficult to properly align the electrodes of the welding equipment with the coupling means and the disk. Small variations in alignment can cause part of the ring to weld very hot, while other parts do not weld at all. Further, when the welds are sufficiently hot to form a strong bond completely around the coupling ring, the ring itself can overheat, causing holes to be burned in the ring and discoloring of the rings.

Figure 7:
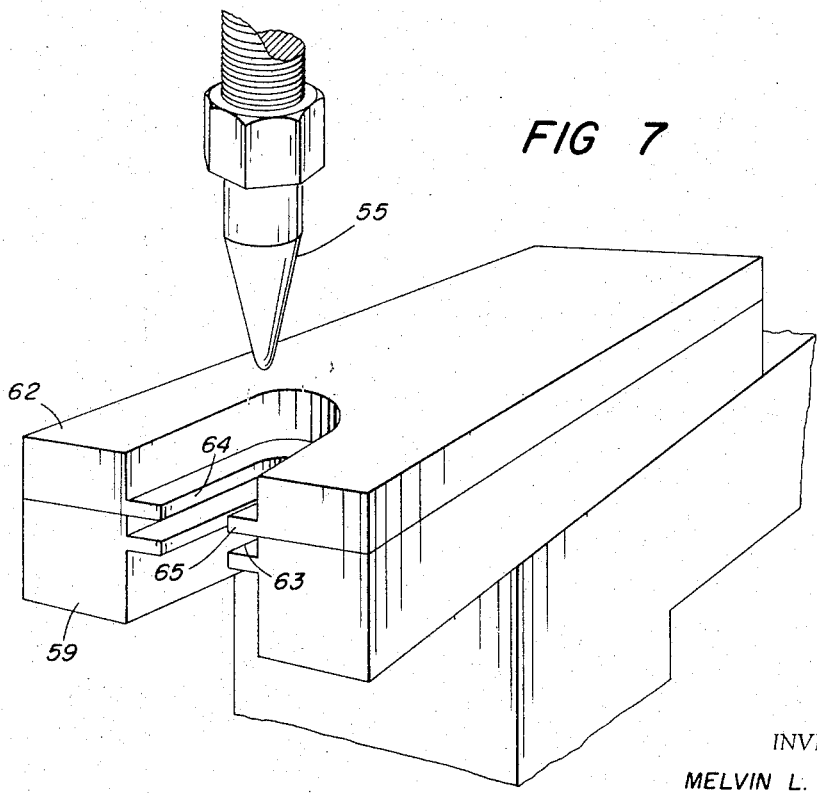
FIG. 7 shows an exploded view of a portion of FIG. 6.
Figure 6:
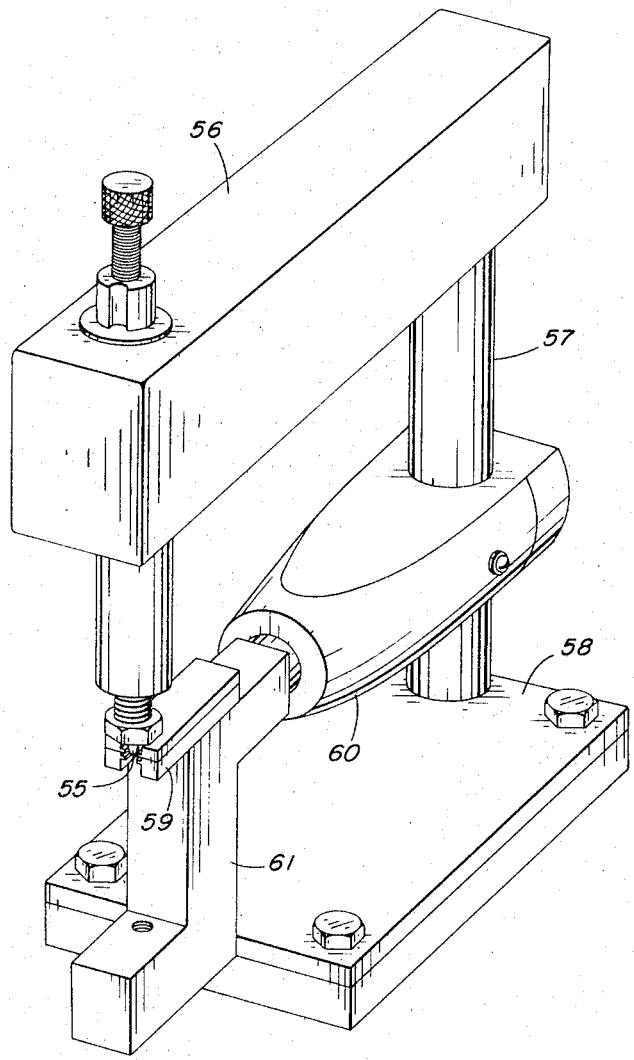
FIG. 6 shows apparatus for making the weld joints of the filter.

It was found that a welding machine of the general type shown in FIGS. 6 and 7 functions to make a suitable weld. In the structure of FIG. 6 the upper electrode 55 is supported by the casing 56 enclosing the voltage generating equipment and a shaft 57 mounted upon a base 58. The lower electrode 59 is mounted upon a frame, including vertically adjustable arm 60 and a bed 61. In FIG. 7, which shows a blown-up view of the electrode portions of the structure of FIG. 6, the electrode 55' is shown as having a conical shape, and is separated from the lower electrode 59' by means of a phenolic positioning element 62. The disks are inserted in the slot 63 and the rings are positioned on top of the disk in-between the collars 64 and 65. Subsequently, the electrode 55' is lowered into the rings and current is passed through the rings and the disks to the lower electrode 59 to perform the necessary weld. The type of welding performed by the structure of FIGS. 6 and 7 is known generally as upset butt resistance welding, which produces strong and consistent weld bonds.

Figure 4:
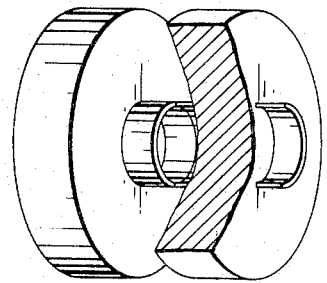
FIG. 4 is a perspective view, with a portion broken away, of two disks employing ring coupling means, wherein each ring coupling means has a one-half portion thereof formed integrally with the disk.

In the structure shown in FIG. 4, wherein one-half of the coupling ring is incorporated as an integral part of the disk itself, the welding problem is somewhat simplified for two reasons. Firstly, the number of welds is cut in half since only one weld is necessary between any two disks. Secondly, the mass of the two elements being welded together is the same, thus eliminating inherent problems in welding a small mass to a larger mass.

In addition to the problems of welding being mitigated by using the structure of FIG. 4, it has been found that variations in welds will have less effect on the temperature coefficient and the Q of the disk resonant element since the weld is not located at the interface of the disk and the coupling ring.

Another, and perhaps better, means of joining together the separate coupling rings as shown in FIG. 3 to the disks, or the integrated coupling ring structure, as shown in FIG. 4, is by means of a suitable bonding material, such as one of the epoxies. Modern epoxies have excellent bonding properties and, of course, do not present the heating problems presented by welding.

It is to be understood that various changes may be made in the forms of the invention shown and described herein without departing from the spirit or the scope thereof.

I claim:

1. Mechanical filter means comprising a plurality of disks of the circular type mode of vibration spaced apart from each other and having their axes lie on a common center line, coupling means for coupling together adjacent disks, said coupling means each comprising a short, thin-walled tubular section of metallic composition with the axis thereof coincident with said common center line, the diameter of said tubular section being substantially equal to the diameter of a circular node of said disks near the natural resonant frequency of said disks.

2. Mechanical filter means in accordance with claim 1 in which each of said coupling means consists of two sections, said sections lying on opposite sides of a plane substantially perpendicular to and bisecting the axis of said ring-like coupling means, each of said adjacent disks being manufactured to have one of said sections on at least one surface thereof as an integral part thereof.

3. Mechanical filter means in accordance with claim 1 in which each of said coupling means constitutes a component which is formed separately from said disks, and comprising means for securing said coupling means to the adjacent disks.

References Cited

UNITED STATES PATENTS

| 2,808,572 | 10/1957 | Ibsen | 333—71 |
| 2,877,432 | 3/1959 | Mattiat | 333—72 |
| 2,906,971 | 9/1959 | Mason | 333—71 |
| 3,051,919 | 8/1962 | Faulk et al. | 333—72 |

HERMAN KARL SAALBACH, Primary Examiner.

C. BARAFF, Assistant Examiner.